United States Patent [19]
Klemann et al.

[11] Patent Number: 5,906,852
[45] Date of Patent: May 25, 1999

[54] SURFACE-MODIFIED CELLULOSE AS LOW CALORIE FLOUR REPLACEMENTS

[75] Inventors: Lawrence P. Klemann, Annandale; Ronald G. Yarger, Madison; Xiaoming You, Morris Plains, all of N.J.

[73] Assignee: Nabisco, Inc., Parsippany, N.J.

[21] Appl. No.: 08/964,062

[22] Filed: Nov. 4, 1997

[51] Int. Cl.$^6$ ..................................................... A21D 2/16
[52] U.S. Cl. .......................... 426/496; 426/89; 426/103; 426/549; 426/653; 426/661; 426/658; 426/804; 426/634; 536/56; 536/63; 536/64; 536/65
[58] Field of Search ............................. 426/89, 103, 549, 426/653, 658, 661, 442, 443, 496, 804, 634; 536/63, 64, 65, 56, 66

[56] References Cited

U.S. PATENT DOCUMENTS

| | | | |
|---|---|---|---|
| 1,990,483 | 2/1935 | Graves | 260/101 |
| 2,400,494 | 5/1946 | Fisher | 260/225 |
| 2,611,767 | 9/1952 | Allen et al. | 260/225 |
| 3,023,104 | 2/1962 | Battista | 99/1 |
| 3,493,319 | 2/1970 | Berni et al. | 8/120 |
| 4,219,580 | 8/1980 | Torres | 426/549 |
| 5,445,678 | 8/1995 | Whistler | 127/67 |
| 5,505,982 | 4/1996 | Krawczky et al. | 426/660 |
| 5,668,273 | 9/1997 | Allen et al. | 536/66 |

FOREIGN PATENT DOCUMENTS 0 086 527  8/1986  European Pat. Off. .

OTHER PUBLICATIONS

Eastman, "Cellulose Esters", 1–9 & 16.
Fed. Reg. 44 #38, 10751–10758, 1979.
Gault, H. and Ehrmann, P., Compt. Rend., 177: 124–127, 1923.
Kwarta, Harpreet S, and Caruthers, James M., "Synthesis of Long Chain Fatty Acids Esterfield onto Cellulose Via the Vacuum—Acid Chloride Process", Ind. Eng. Chem. Res. 31, 2647–2651, 1992.

Sheppard, S.E. and Newsome, P.T., "Some Properties of Cellulose Esters of Homologous Fatty Acids", J. Phys. Chem. 39: 143–152, 1935.

Thomas, W.C., et al, Fd. Chem. Toxic., 29: 453–458, 1991.

*Primary Examiner*—Milton Cano
*Attorney, Agent, or Firm*—St. Onge Steward Johnson & Reens LLC

[57] ABSTRACT

Cellulose is surface-modified by coating and/or acylation with $C_2$ to $C_{24}$, in some cases primarily $C_6$ to $C_{22}$, or more narrowly $C_{16}$ to $C_{20}$, aliphatic acids, to obtain cellulose esters exhibiting a degree of substitution of about 0.05 or less, preferably about 0.01 or less. The surface-modified cellulose is used as a low-calorie carbohydrate replacement in edible compositions having a carbohydrate component. Baked food products such as cookies employ the low-calorie ingredient in place of a starch ingredient in some preferred embodiments. In some of these embodiments, cookies formulated with surface-modified cellulose further contain a spreading ingredient such as polydextrose; in these, the cellulose esters help to control the spread as well as provide calorie reduction. In these and other embodiments, the food products can also contain reduced fat or a low calorie fat substitute and/or an artificial sweetener to provide further calorie reduction.

22 Claims, No Drawings

SURFACE-MODIFIED CELLULOSE AS LOW CALORIE FLOUR REPLACEMENTS

TECHNICAL FIELD

This invention relates to cellulose surface-modified with fatty acids that are useful as full or partial flour or starch replacements in food products.

Weight reduction and maintenance of a desirable weight are concerns of many people in contemporary society. There is an increasing interest in low calorie food products. Many such foods have been formulated to provide calorie reduction by substituting artificial sweeteners for sucrose and/or fat mimetics for the fat component, or reducing the fat content. Since carbohydrates, especially starches, are a significant component of many baked goods and other foods, it would also be advantageous to produce a low calorie starch replacement that would have all the functional qualities of starch but not its caloric value. Such an ingredient could then be employed in cookies, sweet rolls, doughnuts, crackers, pastries, breads, and the like, which are favorites in the diets of those who often struggle to maintain or reduce their present weight.

Cellulose is a ubiquitous fiber found in all plant sources, including algae, bacteria, and fungi. Cellulose is a polysaccharide composed of 1,4-linked glucose units that are negligibly digestible. Because of this, it would appear that cellulose should be a good low calorie replacement for starch, but attempts to use it as an ingredient in food products have been less than successful. Various forms of purified plant cellulose, such as crystalline α-cellulose sold under the tradename Solka-Floc® and microcrystalline cellulose sold under the tradename Avicel® have been employed as partial flour substitutes. (See, for example, U.S. Pat. No. 3,023,104 to Battista and Eur. Pat. Ap. Pub. No. 86,527 to Robbins and Rodriguez.) When used at levels of 20% or more to produce a significant calorie reduction, products employing these substitutes have an objectionable texture and exhibit a chalky or gritty, fibrous, and unpalatable mouthfeel when consumed. These effects are observed even when the particle size of the cellulosic material is reduced.

Despite its plethora of hydroxyl groups, cellulose is intrinsically insoluble in water. This feature is ascribed to the cooperative cohesion of its chain segments in its crystalline domains. It is generally accepted that cellulose is composed of a stable two-phase structure of crystalline and non-crystalline domains. Though water-insoluble, it absorbs two to seven times its weight in water, a characteristic that does not render cellulose a desirable low calorie food ingredient for baked goods since considerable energy must be expended to remove the water, and baking problems are created. The water insolubility also creates difficulties in forming dispersions in some food formulations.

BACKGROUND OF THE INVENTION

Cellulose has been modified in several ways. Cellulose acetates and acetate/butyrates have been well known for years and have found use as adhesives in packaging, as filters for blood, food, and water purification systems, and as components of synthetic fabrics such as rayon. These derivatives have a high degree of substitution (DS), i.e., DS=2 to 3, with 3 representing full acylation of non-terminal glucose units. Some commercially available cellulose acetates are approximately 50% or more by weight acetate. (See, for example, the description and specification for several commercially available products in Eastman's "Cellulose Esters", 1995, pp. 1–9 and 16.) The acetates are considered GRAS (Generally Recognized as Safe) materials and are approved for contact with food such as packaging materials (see Federal Register, 44, No. 38, 10751–10758, 1979). In subchronic oral toxicity studies in rats, administration of cellulose acetate at dosage levels of 0 to 5000 mg/kg, no adverse effects have been observed (Thomas, W.C., et al., *Fd. Chem. Toxic.*, 1991, 29: 453–458).

Cellulose mixed esters have also been previously described. These derivatives, when acylated with a mixture of shorter acetyl and/or butyryl groups and longer groups, are typically prepared by the reaction of cellulose acetate and/or butyrate with fatty acid anhydrides or chlorides or direct reaction of cotton, which is 90% cellulose, or other cellulosic material with fatty acids. These derivatives have been disclosed as useful in film formation and textile treatment. See, for example, U.S. Pat. No. 1,990,483 to Graves, U.S. Pat. No. 2,400,494 to Fisher, and U.S. Pat. No. 2,611, 767 to Allen and Hawkes.

Acylation of cellulose hydroxyl groups with higher fatty acids has also been reported. Cellulose was rendered more soluble in water by esterifying with two laurate ($C_{12}$), palmitate ($C_{16}$) or stearate ($C_{18}$) groups per glucose unit (Gault, H., and Ehrmann, P., *Compt. rend.*, 1923, 177: 124–127). The physical properties of cellulose triesters of homologous $C_2$ to $C_{18}$ fatty acids were published in 1935 by Sheppard and Newsome (*J. Phys. Chem.* 39:143–152). The research, however, did not then result in the marketing of a commercial product, but some of the findings relating to the acylation of cellulose were applied to the modification of cotton to provide dry and wet crease recovery, improved viscoelastic properties such as elongation at break, and the like (see, for example, U.S. Pat. No. 3,493,319 to Berni and McKelvey). Essentially fully substituted fatty acid cellulose esters have recently been suggested as potential biodegradable plastics (Kwatra, H.S., et al., *Ind. Eng. Chem. Res.*, 1992, 31: 2647–2651). Most of the published syntheses of higher esters employed processes using reactants, solvents and/or catalysts not desirable for food use products, and, where the reaction products were characterized, they were highly substituted.

Various coatings and hydrolysis techniques have been disclosed as alternatives to the chemical substitution of cellulose to modify its properties for various uses, including incorporation into edible compositions. In U.S. Pat. No. 4,219,580 to Torres, for example, microcrystalline cellulose or an acid-treated starch derivative are processed with xanthan gum and a food grade emulsifier such as lecithin to provide a flour substitute. In the patent's examples, the coated product is employed in cake and cookie recipes. Similarly, Krawczyk, et al., suggested coprocessing particulate cellulose with a surfactant to form a composite that could be used as a bulking agent or functional formulary aid in chocolate confections (U.S. Pat. No. 5,505,982). Cellulose coatings that are physically sorbed, however, have a tendency to clump, and are difficult to disperse in some recipes. U.S. Pat. No. 5,445,678 to Whistler avoided this disadvantage by disclosing a granular starch that was partially hydrolyzed using acid or amylase and/or mechanically disintegrated to form a granular starch-derived microcrystalline starch composition, but it was so hydrolyzed that it was suggested for use as a fat substitute, not a flour substitute, in reduced calorie foods.

It would be desirable to have other methods of altering nondigestible cellulose. It would also be desirable to have other low calorie flour substitutes.

DISCLOSURE OF THE INVENTION

An object of the present invention is to provide a method for the surface-modification of cellulose, and compositions utilizing surface-modified cellulose.

It is another object of the invention to provide a hydrophobic sheath to cellulose to provide a powdered product useful in different foodstuffs, particularly baked goods, that functions like a flour and exhibits a desirable texture when used in a conventional recipe that calls for flour or other starch ingredient.

It is a further and more specific object of the invention to provide an essentially calorie-free starch replacement for edible compositions, particularly baked goods such as cookies.

These and other objects are accomplished by the present invention, which provides edible surface-modified cellulose compositions containing cellulose and from 1 to 10% $C_2$ to $C_{24}$, in some embodiments primarily $C_6$ or $C_8$ to $C_{22}$, or more narrowly $C_{16}$ to $C_{20}$, aliphatic acids. In one embodiment, at least about 50% of the cellulose is acylated with the acid such that it exhibits a degree of substitution of about 0.05 or less, preferably 0.01 or less. The invention correspondingly provides edible products having a carbohydrate component containing the surface-modified cellulose in at least partial replacement of the carbohydrate, particularly baked products such as cookies. In some embodiments, cookies containing surface-modified cellulose of the invention further contain a spreading ingredient; in these and other embodiments, the cookies can also contain an artificial sweetener, and reduced fat or a low calorie fat substitute to provide further calorie reduction.

The invention also provides methods of reducing calories in food products having a carbohydrate component by using the cellulose esters of the invention in full or partial replacement of the carbohydrate component. In preferred embodiments, a starch calorie reduction of at least 25% is achieved.

BEST MODES FOR CARRYING OUT THE INVENTION

This invention is based upon the finding that when aliphatic acids are used to surface coat and in some cases lightly-derivatize the surface of cellulose (i.e., so that the resulting cellulose ester exhibits a low degree of substitution, with DS preferably less than 0.01), hydrophobic materials are produced that function well as flour replacers in cookies and other food products, and exhibit a number of other desirable characteristics.

In the practice of the invention, cellulose is surface coated and/or acylated with up to about 10% $C_2$ to $C_{24}$ aliphatic acids to form cellulose esters having a degree of substitution (DS) of about 0.05 or less, preferably 0.03 or less, and even more preferably 0.01 or less. It is significant that the acylation of the cellulose is believed to be a surface phenomenon only. Acylation of the surface to a degree of substitution of 0.001 or more will prevent the solvent removal of the acid. It is therefor believed to be chemically bound to the surface. Since fully acylated cellulose esters exhibit a DS of 3, derivatized cellulose described herein is also called "lightly derivatized" or "surface-modified" cellulose because most of the pendant ester groups are located on the exterior of the molecule. While not wishing to be bound to any theory, it is believed that this location and arrangement of fatty pendant groups contributes to the advantageous properties observed in the starch replacement of the invention. In certain of the embodiments, at least about 50%, preferably at least about 75 %, of the cellulose is lightly derivatized and exhibits a DS of about 0.01 or less (i.e., about 1% or less by weight).

Any alkyl, alkenyl, or alkynyl aliphatic acid may be employed as a pendant group in the acylated, surface-modified cellulose of the invention. Where the term "cellulose acylated with aliphatic acids" is employed, by that is meant that the aliphatic acid groups are attached to cellulose hydroxyl groups by means of ester linkages, forming cellulose esters. $C_2$ to $C_{24}$ aliphatic acids useful in the invention include, but are not limited to, acetic acid, propionic acid, butyric acid, caproic acid, caprylic acid, pelargonic acid, capric acid, lauric acid, myristic acid, palmitic acid, palmitoleic acid, stearic acid, oleic acid, elaidic acid, linoleic acid, linolenic acid, eleostearic acid, arachidonic acid, nervonic acid, behenic acid, lignoceric acid, and mixtures thereof. As used herein, chemical names include isomeric variations; for example, "butyric acid" includes normal-butyric and/or isobutyric acid, and so forth.

In many embodiments, the acids are mixtures derived from non-hydrogenated, partially hydrogenated, or fully hydrogenated feedstock oils, fats or waxes; hydrogenated oils are preferred in some embodiments. Feedstock oils useful in preparing surface-modified cellulose of the invention include, but are not limited to, soybean, safflower, sunflower, high oleic sunflower, canola, sesame, corn, peanut, olive, rice bran, babassu nut, palm, mustard seed, cottonseed, poppyseed, high erucic rapeseed, shea, marine, meadowfoam, and the like oils, and mixtures thereof. Aliphatic acids derived from processed or unprocessed tallow, lard, shea butter, dairy butter, or plant waxes such as jojoba may also be used. Specific fractions of processed or unprocessed oils, fats, or waxes may be used, and/or mixed with any oil, fat, or wax, and are advantageous in some embodiments.

Many preferred embodiments employ primarily, i.e., at least about 75%, $C_6$ to $C_{22}$ aliphatic acids. In one embodiment, at least about 60%, preferably at least about 75%, and in many cases at least about 90% of the aliphatic acids are $C_{16}$ to $C_{20}$ acids. Preferred feedstocks for these embodiments are soybean oil, canola, high oleic sunflower oil, and mixtures thereof. In many preferred embodiments the fatty acids are saturated to prevent peroxidation. In this regard, stearic acid is particularly useful. It is high melting, abundant and forms an effective coating for the preferred utilities of the invention. In other embodiments illustrated hereafter, feedstocks having the $C_{18}$ component containing a significant amount of oleic acid, i.e., from about 10% to 90%, more narrowly from about 20% to 80%, by weight oleic acid are employed.

Surface-modified cellulose of the invention may be prepared using coating and synthetic procedures known to those skilled in the art, such as, for example, coating in a turbulent contact device, directly esterifying cellulose or cellulose esters with aliphatic acids, aliphatic acid halides, or aliphatic acid anhydrides, or trans- or interesterifying cellulose esters for such time under such conditions that lightly-derivatized cellulose is formed. Preferred processes for food products involve the direct surface coating and/or esterification of cellulose with aliphatic acids so that unwanted reactants, byproducts and/or solvents are not present, requiring removal for use of the product in a foodstuff. Though, as is appreciated by the skilled worker, the aspect ratio of various cellulose preparations varies, preferred cellulose substrates for the esterification reaction are micro-crystalline and exhibit a particle size of from about 1 to about 400 $\mu$, more narrowly from about 10 to about 200 $\mu$, preferably less than about 20 $\mu$. In many preferred embodiments, excess acid recovered from a typical reaction may be recycled for another synthesis.

In one embodiment of a cellulose surface-modification reaction, for example, micro-crystalline cellulose is simply mixed with aliphatic acid(s) and heated to about 80° to about 210° C., and in some embodiments more narrowly from about 120° to 195° C., e.g., at about 185° C., and agitated for a period of approximately ten to thirty minutes at atmospheric pressure. Other means of introducing energy to the reaction known to skilled workers can also be employed, including ultra sound, microwave radiation, and mixtures of these with each other and with heat. The mixture may then be filtered to remove unreacted acid. The product can be washed, e.g., with 50% ethanol-water, to remove excess or unreacted acid, and air-dried overnight. Nearly all of the cellulose esters of the invention are found to float on water.

In another embodiment, powdered cellulose and stearic acid, in a 20:1 weight ratio, are blended together in a high capacity Turbulizer® mixer at 190° C. operating at about 4000 rpm. The mixture is transferred directly to an efficient dryer that agitates and dries the blended ingredient at 185° C. over a period of 5 to 30 minutes, after which the material is quickly cooled to room temperature and transferred to a collection device. The resulting off-white, dry powder is ready for use such as in baking.

Heat is effective to melt a solid acid such as stearic acid, and strong blending coats the melted acid onto the surface of the powdered cellulose. Any high speed shear mixer for coating can be employed according to this aspect of invention, such as, for example, a Turbulizer® or Solidaire® mixer. Solvents are not required, but are employed in some embodiments. If employed, solvents may be removed during and/or after the coating process. Should the coated cellulose clump or agglomerate, it may be ground or milled prior to use in a food composition using conventional means, e.g., by use of a Pulvocron®, Disintegrator®, Jet® mill, or the like to provide a powdered, flour-like final product.

In the practice of the invention, surface-modified cellulose of the invention is employed to replace all or part of the starch component of any edible composition, particularly food products, which have a carbohydrate component, including all-purpose or unbleached wheat flour, rye, potato, rice or other cereal flours, and starches such as cornstarch, oats, nut meals, and mixtures thereof. Derivatized or coated cellulose of the invention can be employed as the full or partial starch replacement for all types of leavened baked products, both yeast-raised and chemically leavened, and unleavened baked products, and as coatings or coating ingredients for the same types of products. Derivatized or coated cellulose of the invention are also useful in snack food products, cereal products, and products containing starch as a thickener.

Representative of starch-containing food products which can contain, in addition to other food ingredients, surface-modified cellulose of the invention in full or partial replacement of the starch component are pancakes, waffles, croissants, doughnuts, breakfast cereal, pasta, pet foods, frozen novelties, dairy products, meat products, egg products and substitutes, nut products, candies, puddings and pies, liquid and dried coffee lighteners, gravies, and bakery products, e.g., cookies, cakes, breads, rolls, pastries, biscuits, savory crackers, and pizza, and mixes and premixes for any of these. Cellulose esters of the invention are particularly efficious in food products having a significant starch component.

Modified cellulose of the invention is especially useful as a starch replacement in bakery goods such as in cookie and cake recipes. By the term "cookie" is meant any of a variety of small cakes, usually flat or slightly raised, that are prepared by rolling and cutting, dropping, or shaping dough and then baking it, or by cutting dough into pieces after baking. A cake is any baked product made from a sweetened dough or batter, including conventional types containing flour and other ingredients, leavened with yeast, baking powder, or beaten egg whites, and, optionally, iced. Both cakes and cookies typically contain flour, water, sugar, and shortening in reasonable proportions, and can have the flour or other starch component reduced by using the modified cellulose of the invention.

It is an advantage of the invention that modified cellulose is essentially non-digestible, delivering less than 0.5 kcal/gram. In preferred embodiments, it is used in carbohydrate-containing food products in amounts sufficient to produce at least about a 25% reduction in calories from the carbohydrate component. Thus, in recipes, it is typically used to replace from about 25% to 100% of the carbohydrate component. In some embodiments, at least about 25% to about 50% of the carbohydrate component is replaced by cellulose esters of the invention.

The low calorie carbohydrate ingredient of the invention can be employed with other low calorie ingredients such as artifical sweeteners and/or fat substitutes to further reduce the overall caloric content of food products such as cookies. Cellulose esters of the invention, for example, can be employed in compositions with natural or artificial sweeteners, or mixtures thereof. Natural sweeteners include, but are not limited to, sugar (sucrose), glucose, fructose, and maltose. Artificial sweeteners include, but are not limited to, 1-aspartyl-1-phenylalanine methyl ester (commercially available as aspartame or Nutri-Sweet®), saccharine, cyclamate, the potassium salt of 6-methyl-3,4-dihydro-1,2,3-oxathiazin-4-one-2,2-dioxide (commercially available as acesulfame-K®), or a mixture of these.

If an artificial sweetener is used, it is generally present in much smaller amounts due to the higher sweetening potency and intensity of most artificial sweeteners (which can be up to 50,000 times as sweet as sugar). In this case, at least 10% by weight of a bulking agent is typically included in inventive composition in order to insure that the texture, form and other characteristics of a conventional food product are maintained. Typical bulking agents which are suitable for use in these instances should advantageously contribute no or little taste to the product and are preferably carbohydrates, most preferably at least partially if not wholly nondigestible. Exemplary of such bulking agents are polydextrose, isomalt (commercially availalbe as Palatinit®), isomaltulose (commercially available as Palatinose®), polyglucose, polymaltose, carboxymethyl-cellulose, microcrystalline cellulose, cellulose gel, arabinogalactan, fructooligosaccharide (available as Nutraflora® and Raftilose P95®), galactooligosaccharide, glucooligosaccharide, 4-O-(β-galactosyl)-D-sorbitol (available as Lactitol®), polyethylene glycol, and D-mannitol, as well as mixtures or combinations of any of these.

Where cellulose esters are employed as a starch replacement in recipes containing an artificial sweetener and a bulking agent or other spreading ingredient, it is an advantage of the invention that cookie spread is reduced by use of the esters. By "cookie spread" is meant the horizontal movement in the cookie dough mass as it is subjected to oven baking conditions. By "stack height" is meant the vertical movement of the cookie dough mass during baking. Spreading ingredients include, but are not limited to, shredded coconut, coarse oats, oatmeal without fines, and bulking agents such as polydextrose. One preferred cookie embodiment contains surface-modified cellulose, an artificial sweetener, and polydextrose.

Polyunsaturated fats also induce spread in baked products. It is therefore another advantage of the invention that where natural triglycerides rich in highly desirable or essential fatty acids such as oleic, linoleic, linolenic, or eicosapentaenoic acid, or triglycerides bearing fatty acids having beneficial attributes such as those associated with conjugated linoleic acid isomers, are employed in the fat component of a baked composition containing modified cellulose in the carbohydrate component, spread can be controlled. Thus, another preferred cookie embodiment contains surface-modified cellulose in the carbohydrate component and a polyunsaturated shortening in the fat component.

It is another advantage that cellulose esters of the invention not only exhibit substantially no calories, but also have the proper texture for use as a flour. While not wishing to be bound to any theory, it appears that the coating or chemisorption of aliphatic acids on the surface of the cellulose provides it with a hydrophobic sheath that makes it especially advantageous for baking purposes. Surface-modified cellulose is powdered, and does not form the clumps often observed when cellulose or physically coated cellulose derivatives are employed as starch replacements in food formulations.

Modified cellulose can not only be employed in recipes containing full calorie shortenings or other fats or oils, but, as mentioned above, it can also be used in reduced fat recipes, and in recipes containing fat substitutes. Fat substitutes include any heretofore suggested, including, but not limited to, triglycerides bearing short and long pendant groups, sugar esters, neoalkyl esters, polyglycerol esters, malonate esters, propoxylated glycerols, retrofats, carboxy/carboxylates, polyvinyl alcohol esters, and the like.

As illustrated hereafter, for typical cookies, the dough is formulated by combining the starch component and mixing it into a creamed shortening component for a period of time sufficient to provide a uniform blend, and then optional flavorings and/or particulates may be added. Sufficient aqueous components may, optionally, also be added under conditions effective to provide the consistency typically desired for shaping and forming conventional doughs, e.g., sufficient to make a dough that has a viscosity appropriate for further processing by dropping, sheeting and/or cutting. On completion of the dough preparation, the dough is typically pressed into baking pans, or fed to equipment wherein it is divided into suitably sized portions and/or sheeted to the size required using rotary molding or wire cut cookie equipment, and deposited on baking pans. Baking pans are typically metal, but can also be ceramic, glass, paper, and/or plastic.

It has been found that changing the order of ingredient addition can be used in the practice of some embodiments of the invention to control the geometry of cookies containing modified cellulose. For example, in some embodiments, modified cellulose is first mixed with the shortening ingredient, and then the admixture is blended with the other dry ingredients, aqueous ingredients, flavorings, and/or particulates.

EXAMPLES

The following examples are presented to further illustrate and explain the present invention and should not be taken as limiting in any regard. Unless otherwise indicated, all parts and percentages are by weight, and are based on the weight at the particular stage of the processing being described.

Example 1

This example illustrates the preparation, characterization and properties of some cellulose esters of the invention.

Materials. Powdered cellulose (approximately 6 to 300 μm particle size) and cellulose acetate butyrate (MW=52,000) were obtained from Aldrich Chemical Co. (Milwaukee, Wis.), and Solka-Floc® 200 (a powdered cellulose) was obtained from the Fiber Sales and Development Corporation (Green Brook, N.J.). Micro-crystalline cellulose, Avicel® PH-105, was obtained from the FMC Corporation (Philadelphia, Pa.). Bromine, carbon tetrachloride, propyl acetate, acetyl chloride, butyryl chloride, palmitoyl chloride, and stearoyl chloride were also obtained from Aldrich and used as received. Ethyl acetate and acetone were obtained from EM Science (Gibbstown, N.J.). Oleoyl chloride (70% technical grade) was obtained from Aldrich and distilled prior to use.

Preparation of Cellulose Esters. In a typical procedure for preparing cellulose esters of light derivatization, 30 g of cellulose powder are mixed, magnetically stirred, and heated at 140° C. with 160 g of oleic acid in a 1-liter round bottom flask for five hours, after which the mixture was filtered to remove unreacted oleic acid. The product is washed with 50% ethanol-water and air-dried overnight. Alternately, 0.015 mole of an acid chloride is dissolved in 100 mL of propyl acetate followed by the addition of 20 g of cellulose powder. After stirring for two hours the white powder is filtered via suction through a Büchner funnel and is thoroughly washed with acetone and air-dried to yield an odorless white powder. Acetone and ethyl acetate were found to be acceptable solvents for this reaction as well.

Preparation of 9,10-Dibromostearoyl Chloride. 15.0 grams of distilled oleoyl chloride (0.05 mole) in 75 mL carbon tetrachloride was treated with 9.6 g bromine (0.06 mole) in 40 mL carbon tetrachloride and magnetically stirred for 2.5 hours. The solvent and unreacted bromine was removed via rotary evaporation. Powdered cellulose (BH-300) was obtained from the International Filler Corporation (Atlanta, Ga.) Proton NMR analysis indicated a quantitative conversion of the oleoyl chloride to 9,10-dibromostearoyl chloride (approximately 30% of this existed as the acid bromide).

Analytical Methods and Physical Measurements. Infrared analyses of the cellulose derivatives were obtained on a Perkin-Elmer System 2000 FTIR with a multiple internal reflectance (MIR) accessory. Halogen analyses. Quantitative analysis of bromine was achieved by the method of inductively-coupled plasma (ICP) analysis using a Perkin-Elmer Optima 3000 instrument. Hydrophobicity. The cellulose esters were crudely tested for hydrophobicity prior to baking by adding approximately 0.1 g of the material to a test tube containing 5 mL water. Hydrophobic derivatives "floated", while those that were not hydrophobic immediately diffused through the water and eventually settled. Differential Scanning Calorimetry. The melting characteristics of the cellulose samples were obtained on a Seiko Model SSC-5200 (DSC 220C). Separation techniques. An easy and quantitative separation of the cellulose esters from untreated cellulose was demonstrated by adding a 1 gram mixture of equal parts cellulose and cellulose oleate to 50 mL water in a separatory funnel. The cellulose oleate floated, while the untreated cellulose eventually settled. This was drawn off, leaving the more hydrophobic cellulose ester behind. Drying and weighing both portions of the powders yielded good recovery of the materials. Dynamic Contact Angle. The angle of contact a drop of water makes with the surface of compressed cellulose or cellulose ester was determined by First Ten Angstroms (Portsmouth, Va.). This procedure examines the surface tension of a substance and can be used as a measure of the hydrophobicity of a substance. Surface area measurement. This measurement was obtained by the Quantachrome Corporation (Fairfield, N.J.).

Determination of Derivatization. Cellulose was first shown to be derivatized, creating a hydrophobic material, with the observation that when the product of the coupling reaction between an acid chloride and cellulose was added to a test tube containing 5 mL water, the product floated on the surface of the water. This was quite unlike the original powdered cellulose, which diffused through the water and eventually settled. This simple "test tube test" was then used as a convenient and regular diagnostic indicator of cellulose derivatization for preparations involving the direct reaction between cellulose and fatty acids.

Conventional infrared analysis using potassium bromide (KBr) pellets proved unsatisfactory in elucidating a covalent bond between cellulose and the aliphatic acid because the material was so lightly derivatized that virtually all the IR radiation passed right through the sample, and the instrument could not detect the pendant groups. However, because of its high sensitivity and its designed ability to examine the surface of materials, multiple internal reflectance Fourier transform infrared (MIR) analysis proved very useful for the determination of the degree of substitution of the fatty acid on the carbohydrate and to ascertain whether the acid was linked covalently to the polysaccharide or whether the phenomenon was the result of a surface coating of fatty acid on the cellulose. This technique was used to obtain Adifference@ spectra for cellulose and its derivative esters and showed a carbonyl stretching absorption at a frequency of 1722 $cm^{-1}$, a frequency typical of aliphatic esters. Unesterified aliphatic acids have a carbonyl stretching absorption near 1760 $cm^{-1}$, while acid chlorides have a corresponding absorption at 1815–1785 $cm^{-1}$. Thus, these two forms of oleic acid could be ruled out.

Because these cellulose derivatives are insoluble in nearly all organic solvents, and because the degree of substitution was very low (the solubility of the aforementioned cellulose esters with a high DS are soluble in common organic solvents), nuclear magnetic resonance would not suffice to determine the DS. To achieve the determination, it was necessary to convert the cellulose ester into a species that could be analyzed by a highly sensitive technique, inductively coupled plasma (ICP). Thus, oleoyl chloride was brominated in carbon tetrachloride to form dibromostearoyl chloride that was reacted with cellulose, forming a dibromo derivative that could now be analyzed quantitatively by the ICP procedure. With this technique it was found that bromine represented approximately 0.5% of the weight of the derivative. Since bromine accounts for about one-third of the mass of dibromostearic acid, the amount of aliphatic acid in the cellulose ester is, therefore, about 1%. For a fully esterified cellulose ester, for which DS=3, the oleic acid contributes 82% of the mass as shown in the following calculation:

For DS=3,
Mass oleic acid/(Mass anhydroglucose+Mass oleic acid)= 846/(846+162)=0.84
Another way to write this is, $$3\times 282/(3\times 282)+162=0.84 \text{ or } DS\times 282/DS\times 282+162=0.84$$

Rearrangement and simplification of the equation yields, $$DS=162\times WT\ \%_{FA}/[100\times MW_{FA}-(MW_{FA}\times WT\ \%_{FA})]$$

which, in case of 1% oleic acid by weight for a cellulose oleate, the DS=0.0058.

The moles of oleate ester per gram of cellulose is found to be $3.44\times 10^{-5}$. For commercially available cellulose acetates the DS=2.5 (weight %=48) and the moles of ester per gram of cellulose is $8.01\times 10^{-3}$, leading to a mole ratio of approximately 234:1, comparing the acetate with the oleate. This highlights the very low level of derivatization necessary to achieve a remarkable effects on baking described in the Examples that follow.

Separation of Surface-Modified Cellulose from Cellulose. As an aid to determining the amount of a cellulose derivative in a product, such as a cookie, a 1 g homogeneous mixture of equal parts cellulose and cellulose oleate was added to a separatory funnel containing 50 mL water. This was thoroughly shaken, and it was observed that a portion of the white mixture eventually settled, while another portion remained floating on the water. The portion that settled was drawn off, filtered, air-dried, and weighed. The "floating" portion was rinsed from the funnel and treated the same way. Weights for each portion were comparable and showed good recovery (see Table 1), suggesting that this procedure may provide for a simple separation and quantification of cellulose esters from cellulose itself.

TABLE 1

Separation of Surface-derivatized Cellulose Oleate from Cellulose

| Amt. cellulose used | Amt. CO used | Amt. cellulose recov. | Amt. CO remaining |
| --- | --- | --- | --- |
| 0.50 g | 0.50 g | 0.46 g (92%) | 0.41 g (82%) |

Hydrophobicity Measurements. For a relative measurement of hydrophobicity, samples of cellulose and cellulose oleate prepared by treatment with oleic and with oleoyl chloride were compressed into small pellets and subjected to analysis by the Dynamic Contact Angle method. This procedure determines the angle of contact a drop of water (or other fluid) makes with the pellet surface. The "contact angle" is the interior angle formed by a tangent to the water droplet (where it meets the pellet) and the pellet surface. Using this method, the contact angle for cellulose itself is clearly smaller than that for either of the surface-derivatized materials. This can be attributed to the hydrophilic nature of cellulose, which causes the water droplet to spread; the surface tension for cellulose is greater than that for the cellulose oleate samples. Tighter droplet formation is observed for these materials. The contact angle for cellulose oleate prepared from the acid chloride is greatest, perhaps due to a higher derivatization of the carbohydrate's surface with oleic acid. The contact angle for water on native cellulose is typically 38°, and its drop width is typically 5.84 mm. For cellulose oleate derived from cellulose and oleic acid, the contact angle is typically 56°, and the drop width is 5.02 mm. For cellulose oleate derived from cellulose and oleoyl chloride, the contact angle is 79.9°, and the drop width is 4.14 mm.

Example 2

Cookies having cellulose esters of the invention in replacement of the flour ingredient are prepared and characterized in this Example, and compared with cookies prepared with commercially available cellulose acetate and cellulose butyrate.

Stage 1.
NFDM (nonfat dry milk powder) 2.25 g
salt 2.81 g
soda (sodium bicarbonate) 2.25 g FGS (sucrose) 94.5 g fat (Centrasoy® shortening) 90.0 g Stage 2.

ammonium carbonate (ABC) 1.13 g

HFCS (high fructose corn syrup) 3.38 g water 49.5 g

Stage 3.

flour or flour substitute blend 225.0 g

Mixing Procedure. Blend dry ingredients (NFDM, salt, soda, FGS). Add to fat. Mix at low speed for three minutes, scraping the bowl sides and paddle every 30 seconds. Dissolve ABC in tap water. Add solution to HFCS, and add total solution to the mix. Blend at low speed for one minute and at medium speed for two minutes, scraping the paddle and bowl sides every 30 seconds. Add flour (or flour substitute blend) to the mix and blend at low speed for an additional two minutes, scraping the bowl every 30 seconds. The amount of flour (or flour substitute blend) and water in the mix may vary with the water content of the flour or flour substitute blend.

Baking Procedure. Preheat oven to 400° F., and record the weight of the cookie sheet (cold and hot). Portion four 60 g pieces of dough with minimum deformation and place on the cookie sheet. Lay a rolling pin across the gauge bars of teh sheet, allowing the weight of the pin to compress the dough pieces without additional compressive force. Roll the dough only once. Cut the cookies with a 60 mm cutter, carefully lifting up the scrap dough with a small spatula. Lift cutter straight up from the dough. Record the weight of the dough blanks and cookie sheet. Bake at 400° F. for the prescribed baketime (typically 10.5 minutes). Weigh the cookie sheet with the cookies immediately upon removal from the oven and carefully remove the cookies with a flat spatula.

Baking Results. Compared to a Climax® flour control, cookies made with cellulose powder, at a 25% replacement of flour, were smaller in diameter; stack height and moisture content increased as well (see Table 2). These cookies had a higher shoulder, and the top diameter was larger than the bottom diameter. Rolling sleeve lines were also visible on the cookie surface. The color was paler, and no browning developed. Oil-out was also diminished from the control.

With surface-derivatized cellulose oleate (DS<0.01) at 25% replacement of flour, the dough was slightly more viscous than the Climax® control, while machinability and stickiness were comparable to control. The stack height, spread, and moisture content were between those for the control and the "cellulose cookie". Oil-out was similar to the Climax® control. While the color was paler than for the control, the surface characteristics were quite similar to the control's.

Cookies baked with cellulose butyrate at 25% of flour replacement were also prepared for comparison purposes. With this less hydrophobic ingredient the stack height and moisture increased from the cellulose oleate cookie, and the diameter decreased. Color was pale, though oil-out appeared the same as with cellulose oleate. Dough viscosity was higher. The viscosity order for the dough was 100% Climax® (110 g)>25% cellulose oleate (161 g)>25% cellulose butyrate (222 g)>25% cellulose (432 g).

TABLE 2

Baking Results for Cookies Made with Cellulose Flour Replacers.

| Climax | Cell Oleate | Cell Butyrate | Cellulose |
|---|---|---|---|
| Increasing dough viscosity (g force) - - > | | | |
| 110 | 161 | 222 | 432 |
| Decreasing average diameter (cm, for 4 cookies) - - > | | | |
| 33.3 | 30.5 | 27.8 | 26.3 |
| Increasing stack height (cm, for 4 cookies) - - > | | | |
| 3.7 | 4.6 | 5.3 | 5.5 |
| Increasing moisture content (%) - - > | | | |
| 4.31 | 5.84 | 7.10 | 7.87 |

Another experiment compared cellulose oleate, cellulose butyrate, and cellulose acetate/butyrate with cellulose powder as a 25% flour replacement and a 100% Climax® flour control yielded similar relative results:

TABLE 3

Comparison of Cellulose Esters as Flour Replacers.

| | viscosity, cp | width, cm | length, cm | height, cm | moisture, % |
|---|---|---|---|---|---|
| cellulose oleate | 161 | 30.4 | 30.6 | 4.6 | 5.84 |
| cellulose butyrate | 222 | 27.6 | 28.0 | 5.3 | 7.10 |
| cellulose stearate | 360 | 30.0 | 30.7 | 4.2 | 8.90 |
| cellulose powder | 432 | 25.9 | 26.7 | 5.5 | 7.87 |
| cellulose acetate/butyrate | 89 | 36.0 | 35.2 | 3.2 | 2.31 |
| conventional flour | 112 | 34.1 | 34.4 | 3.6 | 4.44 |

The results show that cellulose esters with a low degree of substitution (i.e., DS=0.0058, or about 1% by weight) are useful as bulking agents and as flour replacements in cookies. The functionality of the novel ingredients is very acceptable.

It was also observed that cookies made from cellulose palmitate, prepared from the reaction of micro-crystalline cellulose (e.g., FMC's Avicel®) with palmitic acid using the procedure described above, resembled the control cookies more than those made with cellulose esters produced from powdered cellulose. This is likely due to the more highly crystalline nature of Avicel®.

Example 3

This example illustrates the use of cellulose of the invention as a low calorie starch substitute in several varieties of cookies.

Vanilla Wafer Cookies are prepared by combining

Example 1 Cellulose Oleate 20.0 parts and

Flour 20.0 parts with

Centrasoy® Shortening 13.0 parts.

To this is added

Sugar (10X) 28.0 parts,

Frozen Whole Eggs 6.0 parts,

High Fructose Corn Syrup 4.0 parts,

Salt 0.7 part,

Vanilla 0.3 part,

Sodium Bicarbonate 0.3 part,

Sodium Aluminum Phosphate 0.1 part,

Ammonium Bicarbonate 0.1 part, and

Water 7.5 parts.

The ingredients are mixed well to form a dough which is aerated, deposited onto a baking surface, and baked.

Regular Chocolate Chip Cookies are prepared by combining

Flour 11.0 parts,

Example 1 Cellulose Oleate 11.0 parts, and

Soybean Oil 20.0 parts.

To this is added

Salt 0.7 part,

Sodium Bicarbonate 0.1 part,

Monocalcium Phosphate 0.1 part,

Vanillin 0.1 part, and

Water 8.0 parts.

The ingredients are mixed well,

Sugar 30.0 parts is added and mixed until dispersed, and then

Chocolate Chips 19.0 parts are added mixed until just blended. The dough is deposited and baked.

Chewy Chocolate Chip Cookies are prepared by combining

Sugar 24.3 parts,

Invert Sugar 20.0 parts,

Example 1 Cellulose Oleate 13.7 parts, and

Centrasoy® Shortening 13.0 parts.

To this is added

Frozen Whole Eggs 12.0 parts,

Sodium Bicarbonate 0.1 part,

Monocalcium Phosphate 0.1 part,

Vanillin 0.1 part, and

Water 7.7 parts.

After mixing,

Chocolate Chips 19.0 parts, are added until just dispersed, and the dough is deposited and baked.

Sandwich Cookies are prepared by combining and mixing well

Flour 36.0 parts,

Example 1 Cellulose Oleate 12.0 parts,

High Fructose Corn Syrup 12.0 parts,

Soybean Oil 10.0 parts,

Dutched Cocoa 5.0 parts,

Corn Syrup, 42 D.E. 3.0 parts,

Dextrose 2.0 parts,

Frozen Whole Eggs 2.0 parts,

Salt 0.3 part,

Sodium Bicarbonate 0.2 part,

Lecithin 0.2 part,

Vanilla 0.2 part,

Ammonium Bicarbonate 0.1 part, and

Water 7.0 parts.

The dough is deposited on baking pans with a rotary mold, baked, and cooled to form basecakes. These are sandwiched, at a weight ratio of 75% basecake, 25% filler, with a filler prepared by melting 37.0 parts Centrasoy® shortening, adding 62.7 parts 10× sugar and 0.3 parts vanillin, mixing, aerating, and cooling.

Example 4

This example illustrates the preparation of a surface-modified cellulose and then using it to prepare soft, chewy chocolate chip cookies.

The surface-modified cellulose was prepared as follows: 150 grams of powdered cellulose BH-300 was added to a magnetically stirred solution of 7.5 grams of stearic acid flakes in 1000 mL of chloroform. The mixture was stirred for five hours, after which the solvent was removed by rotary evaporation. The powdered product was air-dried for 12 hours before use as a baking ingredient.

The cookies were prepared by mixing the following ingredients in the following stages.

Stage 1

NFDM (nonfat dry milk powder) 5.00 g

Egg albumen 3.13 g

Instant corn starch 16.25 g

Salt 3.13 g soda (sodium bicarbonate) 8.91 g

Stage 2

Salatrim shortening 50.00 g vanilla extract 5.00 g

70% polydextrose 147.50 g molasses 16.88 g liquid fructose 69.38 g panodan:sdk 3.75 g Stage 3

Water 10.00 g

Surface-modified cellulose 62.50 g

Stage 4

FGS (sugar) 37.50 g sodium aluminum phosphate 1.56 g bleached pastry flour 187.50 g Stage 5

Salatrim chocolate drops 150.00 g

Mixing Procedure

Mix ingredients for Stage 1 together at low speed for 1 minute. Blend in the Stage 2 ingredients at low speed for one minute, then at high speed for 4 minutes. Add Stage 3 ingredients and mix at medium speed for three minutes, followed by addition of Stage 4 elements, blending at low speed for four minutes. Finally, add the Salatrim drops, mixing at low speed for 10 seconds.

Baking Procedure

Preheat the oven to 400° F. Place approximately 13.5 g pieces on a cookie sheet and bake at 400° F. for seven minutes.

The papers and patents cited above are hereby incorporated herein in their entireties by reference.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are meant to cover the claimed components and steps in any sequence that is effective to meet the objectives there intended, unless the context specifically indicates the contrary.

We claim:

1. An edible composition comprising cellulose surface coated and/or acylated with $C_2$ to $C_{24}$ aliphatic acids, wherein at least about 50% of the cellulose exhibit a degree of substitution of about 0.05 or less.

2. A composition according to claim 1 wherein the degree of substitution is about 0.01 or less.

3. A composition according to claim 1 wherein the acids are primarily $C_8$ to $C_{22}$ acids.

4. A composition according to claim 3 wherein at least about 60% of the acids are $C_{16}$ to $C_{20}$ acids.

5. A composition according to claim 1 which delivers less than about 0.5 kcal/gram.

6. A composition according to claim 1 wherein the cellulose is coated with stearic acid.

7. An edible product having a carbohydrate component comprising the composition of claim 1 in at least partial replacement of the carbohydrate component.

8. An edible composition comprising cellulose surface coated and/or acylated with $C_6$ to $C_{24}$ aliphatic acids, having a degree of substitution of about 0.05 or less.

9. A composition according to claim 8 wherein the degree of substitution is about 0.01 or less.

10. A composition according to claim 8 wherein at least about 60% of the acids are $C_{16}$ to $C_{20}$ acids.

11. A composition according to claim 10 wherein the acids comprise saturated acids.

12. A composition according to claim 8 which delivers less than about 0.5 kcal/gram.

13. A food product having a carbohydrate component comprising the composition of claim 8 in at least partial replacement of the carbohydrate component.

14. A food product according to claim 13 comprising a cookie.

15. A food product according to claim 14 wherein the cookie further comprises an artificial sweetener, and reduced fat or a low calorie fat substitute.

16. A food product according to claim 14 wherein the cookie further comprises a spreading ingredient.

17. A food product according to claim 13 wherein the cellulose is coated with stearic acid.

18. A food product according to claim 16 wherein said spreading ingredient is polydextrose.

19. A method for reducing calories in an edible composition having a carbohydrate ingredient comprising replacing at least a portion of the carbohydrate ingredient with cellulose coated and/or acylated with $C_2$ to $C_{24}$ aliphatic acids, and having a degree of substitution of about 0.05 or less.

20. A method according to claim 19 wherein at least about 25% of the carbohydrate ingredient is replaced.

21. A method according to claim 19 wherein the cellulose is acylated with $C_6$ to $C_{22}$ aliphatic acids, and has a degree of substitution of about 0.01 or less.

22. A method according to claim 21 wherein the acids comprise saturated acids.

* * * * *